Sept. 10, 1946.  R. BURK  2,407,471
ROTARY TOOL ADAPTER
Filed Dec. 11, 1944

Inventor
Robert Burk

Patented Sept. 10, 1946

2,407,471

UNITED STATES PATENT OFFICE 2,407,471

ROTARY TOOL ADAPTER

Robert Burk, Brazil, Ind., assignor of one-half to W. C. Brockmeier, Brazil, Ind., and one-half to M. R. Harding, Greenville, Mich.

Application December 11, 1944, Serial No. 567,676

2 Claims. (Cl. 279—103)

The invention relates to a milling machine attachment, and more especially to a rotary tool adapter for use on a milling machine.

The primary object of the invention is the provision of an adapter of this character, wherein the tool to be used in the milling machine is applied in the conventional manner, and when it is required to remove the tool, this being accomplished without removing the adapter therefor, the tool removal being effected through the service of a hydraulic ejector, which is under the control of a single attendant for the milling machine.

Another object of the invention is the provision of an adapter of this character, wherein for the removal of a rotary tool, such as those used in a milling machine, for drilling, reaming, spot facing, or other milling work, can be conveniently released from its holder, with dispatch and ease, at the location of such holder, and through hydraulic pressure under a hammer blow on a plunger, which is exposed for this purpose.

A further object of the invention is the provision of an adapter of this character, wherein the construction thereof is novel and unique in the arrangement of its parts and the working thereof, the adapter being retained in the machine and does not require removal for the changing of tools as may be necessary for the execution of different characters of work by the said machine.

A still further object of the invention is the provision of an adapter of this character, which is simple in construction, thoroughly reliable and efficient in operation, strong, durable, possessed of few parts, readily and easily operated, requires little or no repairs, thus economical for continued service, devoid of a complicated structural set-up, and inexpensive to manufacture and install.

With these and other objects in view the invention consists in the features of construction, combination and arrangement of parts as will be hereinafter more fully described, illustrated in the accompanying views in the drawing forming a part hereof, which shows the preferred embodiment of the invention, and pointed out in the claims hereunto appended.

In the accompanying drawing.

Similar reference characters indicate corresponding parts throughout the several views in the drawing.

Figure 1:
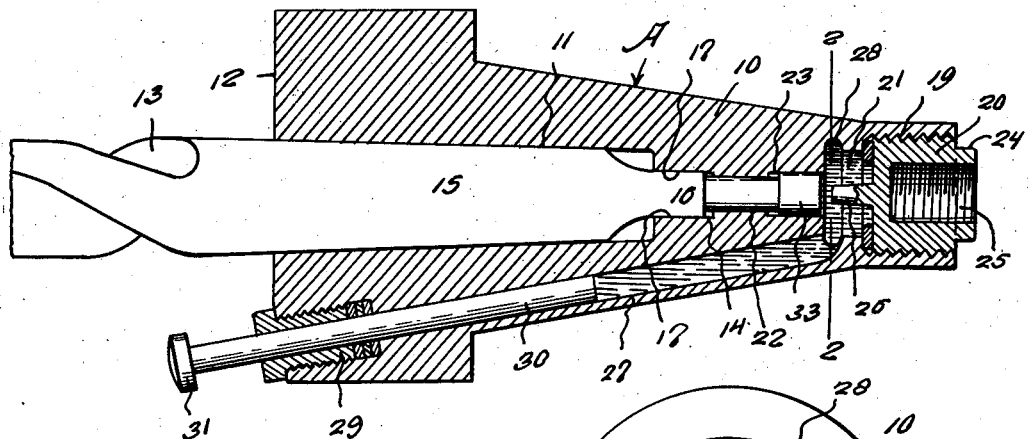
Figure 1 is a view showing the adapter in vertical section, as constructed in accordance with the invention, with a tool held by the adapter.
Figure 2:
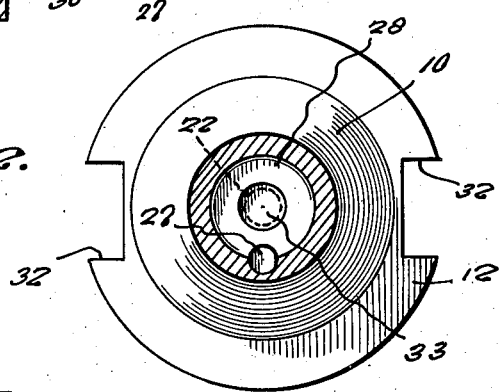
Figure 2 is a transverse sectional view taken approximately on the line 2—2 of Figure 1 looking in the direction of the arrows.

Referring to the drawing in detail, A designates generally a portion of the adapter in its entirety, constructed in accordance with the invention, and is practically conventional in its complete external appearance, with those now in use in milling machines. The adapter comprises, in this instance, a truncated conical shaped body 10, having for a portion of its length the ordinary tool receiving socket 11, which as usual opens through the larger end 12 of the body, for the introduction of the tool 13, which for example, is a drill, of standard construction.

Transversely of the body 10 is the drift hole 14 which communicates with the socket 11. The drill 13 or other tool has a tapered shank 15 and a tang 16 at the end thereof formed as usual in cross section substantially rectangular or otherwise with lateral facets 17. Exampling the usual construction the socket 11 is tapered inwardly conforming to the tapered shank 15 of the tool for tight-fit of the latter within the said socket. The tang 16 engages in the drift hole 14, as best seen in Figure 1 of the drawing, and the facets 17 eliminate the rotation of the tool within the socket 11, as the tang locks the said tool therein.

Figure 3:
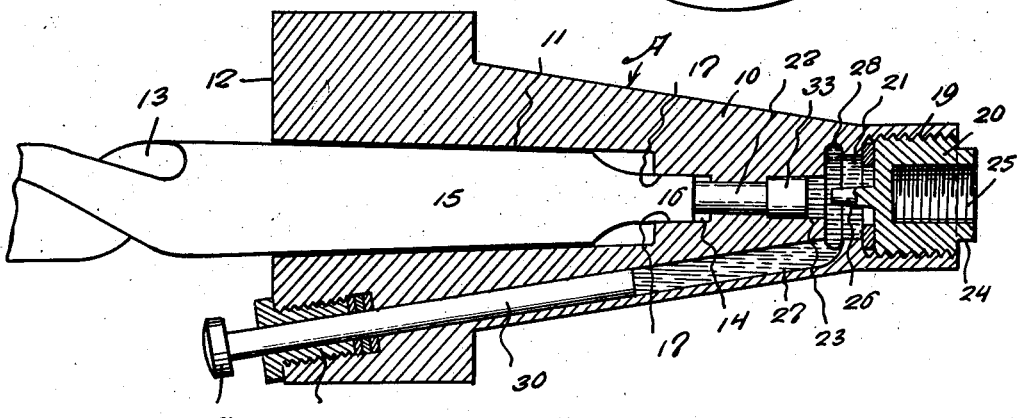
Figure 3 is a view similar to Figure 1 showing the adapter operated with the tool ejected therefrom.

In the small end 18 of the body 10 is a screw threaded plug socket 19 for a threaded plug 20, detachable therefrom, the plug socket 19 being in communication with an oil chamber 21, which confronts an ejector pin 22, having fluidtight fitting with a clearance 23 therefor, and this pin is adapted for direct striking contact with the tang 16 when extended within the drift hole 14, as best seen in Figures 1 and 3 of the drawing.

The plug 20 is formed with a flat faced wrench engaging head 24 at its outermost end, while provided in this end and carried through the head 24 is an internally threaded socket 25, so that the adapter A can be detachably fastened to a driving arbor, not shown, of a milling machine, which also is not shown in the drawing. However, the adapter may be otherwise fitted to the milling machine, for the holding of a tool required to be operated thereby.

The plug 20 at its inner end is provided with a check or stop 26 in the path of the pin 22, to limit the throw thereof in one direction, and thus avoid such pin leaving its clearance 23 when retrieving within the adapter A.

Formed longitudinally in the body 10 eccentric to the tool socket 11 is an oil passage 27, which at its inner end opens into an enlarged area 28 to the oil chamber 21, while the outer end of this passage has associated therewith a countersunk packing gland 29, through which operates a slidable plunger 30, the latter being extended for a distance into the passage 27, and at the outer end of such plunger is formed a striking head 31 for receiving a hammer blow to compress oil filling the said chamber 21 and passage 27, so that when the plunger is forced inwardly of the latter the oil under compression will actuate the pin 22 for ejecting the tool 13 from the adapter A.

The larger end 12 of the body 10 externally thereof is provided with diametrically opposed key slots 32 for use in applying the adapter A to the milling machine. However, this construction may be altered, if found necessary or otherwise required.

The pin 22 is formed with an enlarged head 33, the clearance 23 being constructed to provide therefor in association with the pin.

In the operation of the adapter A after the tool 13 has been fitted therein, and it is desired to change tools, the operator strikes the head 31 with a hammer blow, the said plunger 30 being outwardly extended from the passage 27 a determined degree, with the head 31 exposed, and this blow results in displacing the oil within the passage and the chamber 21, thus moving the pin 22 to a position for ejecting the tool 13 from the socket 11. Whereupon the said socket 11 is cleared for another tool, and the placement of such tool restores the adapter to normalcy, with the plunger projected from the passage 27 in a reset condition. It will be apparent that the adapter A is a hydraulic ejector for a tool held thereby.

From the foregoing it is thought that the construction and manner of operation of the adapter A will be clearly understood, and therefore a more extended explanation has been omitted for the sake of brevity. Furthermore, it is to be understood that changes, variations and modifications may be made in the invention, as fall properly within the scope of the appended claims, without departing from the spirit of the invention or sacrificing any of its advantages.

What is claimed is:

1. An adapter for a milling machine and a rotary tool therefor having a Morse taper tanged shank, comprising an elongated truncated conical body having a centrally located socket with a drift hole for a portion of its length and opening through the larger end for accommodating the tool shank and the engagement of the tang in the drift hole, the said body further being formed with an oil chamber opening through its smaller end and aligned with the drift hole, a removable plug fitting the smaller end of the body for closing the oil chamber and effecting a driving coupling between the said body and the machine, an ejecting pin within the body between the socket and the oil chamber for contacting the tank, and a hammer blow actuated plunger slidably fitted longitudinally in the body within the marginal area of its larger end and extending generally in the direction of the socket for action on the content of the oil chamber to displace the ejecting pin for removing the tang of the tool shank from the drift hole.

2. An adapter for a milling machine and a rotary tool therefor having a Morse taper tanged shank, comprising an elongated truncated conical body having a centrally located socket with a drift hole for a portion of its length and opening through the larger end for accommodating the tool shank and the engagement of the tang in the drift hole, the said body further being formed with an oil chamber opening through the smaller end and aligned with the drift hole, a removable plug fitting the smaller end of the body for closing the oil chamber and effecting a driving coupling between the said body and the machine, an ejecting pin within the body between the socket and the oil chamber for contacting the tank, a hammer blow actuated plunger slidably fitted longitudinally in the body within the marginal area of the larger end and extending generally in the direction of the socket for action on the content of the oil chamber to displace the ejecting pin for removing the tang of the tool shank from the drift hole, and a check extension on the plug to limit the throw of the ejecting pin toward the oil chamber.

ROBERT BURK.